United States Patent
Choi et al.

(10) Patent No.: US 11,606,006 B2
(45) Date of Patent: Mar. 14, 2023

(54) SYSTEM FOR OVERCOOLING DRIVE MOTOR AND METHOD FOR CONTROLLING THE SAME

(71) Applicants: Hyundai Motor Company, Seoul (KR); Kia Corporation, Seoul (KR)

(72) Inventors: Byoung Hoon Choi, Seongnam-si (KR); Sung Hyun Ahn, Suwon-si (KR); Hee Ra Lee, Anyang-si (KR); Jong Hyun Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 180 days.

(21) Appl. No.: 17/346,151

(22) Filed: Jun. 11, 2021

(65) Prior Publication Data
US 2022/0115930 A1 Apr. 14, 2022

(30) Foreign Application Priority Data
Oct. 14, 2020 (KR) .................. 10-2020-0132565

(51) Int. Cl.
*H02K 9/20* (2006.01)
*H02K 9/00* (2006.01)
*H02P 29/60* (2016.01)

(52) U.S. Cl.
CPC ............ *H02K 9/20* (2013.01); *H02P 29/60* (2016.02)

(58) Field of Classification Search
CPC .................................... H02K 9/00; H02K 9/20
USPC ............................ 310/52, 53, 58, 63–64, 66
See application file for complete search history.

(56) References Cited

U.S. PATENT DOCUMENTS

2021/0053412 A1* 2/2021 Kim ................. B60H 1/00271

FOREIGN PATENT DOCUMENTS

| CN | 108016232 A | * | 5/2018 | ......... B60H 1/00021 |
| KR | 10-2012-0059730 A | | 6/2012 | |
| KR | 20200070767 A | * | 6/2020 | |
| KR | 20200103436 A | * | 9/2020 | |
| WO | WO-2018105927 A1 | * | 6/2018 | ............... B60H 1/00 |

* cited by examiner

Primary Examiner — Jose A Gonzalez Quinones
(74) Attorney, Agent, or Firm — Morgan, Lewis & Bockius LLP

(57) ABSTRACT

A system for overcooling a drive motor and a method for controlling the same may include a first cooling loop in which a first coolant circulate, the first coolant being in a heat exchange with a power electronics (PE) part and a drive motor cooler mounted in the first cooling line and configured to cool cooling oil supplied to the drive motor fluidically connected to the drive motor cooler; a second cooling loop disposed independently from the first cooling loop, wherein a second coolant circulates in the second cooling loop, the second coolant being in a heat exchange with a battery module and a battery chiller mounted in the second cooling loop; and a switch unit configured to selectively shift a flow path of the second coolant such that the second coolant is in a heat exchange with the drive motor cooler.

20 Claims, 3 Drawing Sheets

SYSTEM FOR OVERCOOLING DRIVE MOTOR AND METHOD FOR CONTROLLING THE SAME

CROSS-REFERENCE TO RELATED APPLICATION

The present application claims priority to Korean Patent Application No. 10-2020-0132565, filed Oct. 14, 2020, the entire contents of which is incorporated herein for all purposes by this reference.

BACKGROUND OF THE INVENTION

Field of the Invention

The present invention relates to a system for overcooling a drive motor and a method for controlling the same. More particularly, it relates to a system for overcooling a drive motor which overcools the drive motor only for a designated time for which the maximum output of the drive motor of an eco-friendly vehicle is used, compared to existing systems. Accordingly, power performance of the vehicle can be improved without changing the specifications of the drive motor or changing a cooling system of the drive motor.

Description of Related art

Eco-friendly vehicles include a hybrid electric vehicle (HEV), a plug-in hybrid electric vehicle (PHEV), a fuel cell electric vehicle (FCEV), and the like. To these vehicles, applied are a drive motor configured for driving the vehicle and a large-capacity, high-voltage battery supplying power to the drive motor and being electrically rechargeable.

Along with interest in internal combustion engine vehicles (ICEVs), eco-friendly vehicles have recently drawn much attention and development of eco-friendly vehicles is booming. Since the appearance of the eco-friendly vehicles, the percentage of motorized vehicles using drive force of a drive motor has sharply increased.

As engine displacement is increased or a turbo system is added to enhance power performance in the ICEVs, it is necessary to improve the specifications of a drive motor to increase the power performance of the eco-friendly vehicles.

However, heat generated from the drive motor increases as the specifications of the drive motor are increased, so a proper cooling system should be provided. However, in terms of design, cost, etc., it may be unreasonable to apply a drive motor having high specifications merely to satisfy power performance in a certain situation.

Therefore, required is development of a system which can satisfy power performance of a vehicle without modifying the specifications of a drive motor or a drive motor cooling system.

The foregoing is intended merely to aid in the understanding of the background of the present invention, and is not intended to mean that the present invention falls within the purview of the related art which is already known to those skilled in the art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for overcooling a drive motor, which can improve power performance without changing the specifications of the drive motor or a drive motor cooling system.

Various aspects of the present invention are directed to providing a system for overcooling a drive motor which can reduce costs.

The objects of the present invention are not limited to those described above, and other unmentioned objects of the present invention will be clearly understood by a person of ordinary skill in the art from the following description.

The features of the present invention to accomplish the object of the present invention and to perform characteristic functions of the present invention, a description of which will follow, are as follows.

According to various exemplary embodiments of the present invention, a system includes a first cooling loop in which a first coolant is configured to circulate, the first coolant being in a heat exchange relationship with a power electronics (PE) part and a drive motor cooler configured to cool cooling oil supplied to the drive motor; a second cooling loop disposed independently from the first cooling loop, wherein a second coolant circulates in the second cooling loop, the second coolant being in a heat exchange relationship with a battery module and a battery chiller; and a switch unit configured to selectively shift a flow path of the second coolant such that the second coolant is selectively in a heat exchange with the drive motor cooler.

According to various exemplary embodiments of the present invention, a system for overcooling a drive motor comprises: a first cooling loop, wherein a first coolant is configured to circulate in the first cooling loop, the first coolant being in a heat exchange relationship with a power electronics (PE) part and a drive motor cooler configured to cool cooling oil supplied to the drive motor; a second cooling loop arranged independently from the first cooling loop, wherein a second coolant is configured to circulate in the second cooling loop, the second coolant being in a heat exchange relationship with a battery module and a battery chiller; a first control valve being controllable such that the second coolant flowing out of the battery chiller is directed to the drive motor cooler; and a second control valve being controllable such that the first coolant bypasses the drive motor cooler.

Other aspects and exemplary embodiments of the present invention are discussed infra.

The above and other features of the present invention are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuels derived from resources other than petroleum. As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
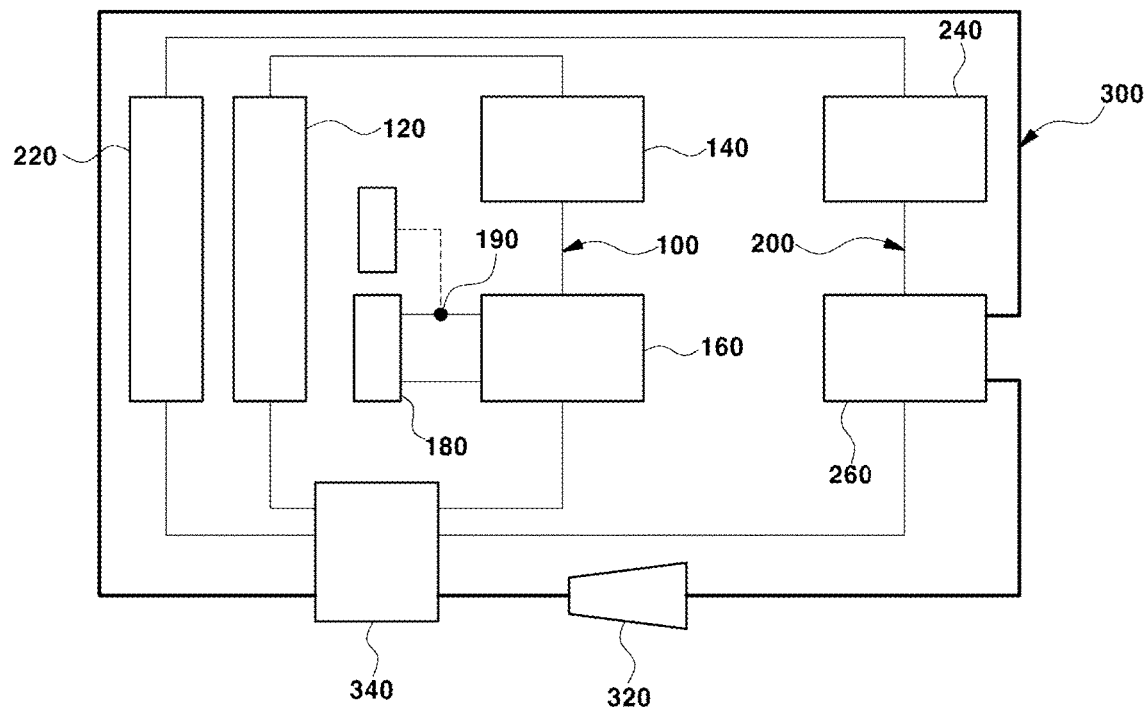
FIG. 1 depicts a system for overcooling a drive motor according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it should be understood that they should not be construed as being limited to the exemplary embodiments described in the present specification, but include all of modifications, equivalents, or substitutes included in the spirit and scope of the present invention.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the exemplary embodiment, specify the presence of stated components, steps, operations, and/or elements, but do not preclude the presence or addition of one or more other components, steps, operations, or elements thereof.

Hereinafter, the present invention will be described in detail with reference to the accompanying drawings.

An eco-friendly vehicle includes a drive motor configured for driving the vehicle, an inverter for rotating the drive motor, and a battery supplying power to the drive motor. The eco-friendly vehicle further includes Power Electronics (PE) components for conversion of electric power, such as a converter (for example, a Low-voltage DC-DC Converter (LDC)), an On-Board Charger (OBC), etc.).

As in the ICEVs, heat is generated due to energy loss in various parts, such as high-voltage parts, in the eco-friendly vehicle. Accordingly, a cooling system configured to remove the heat is necessary. Furthermore, the vehicle includes an air conditioning system for maintaining temperature of a vehicle cabin at a proper level.

In the eco-friendly vehicle, a water-cooled type cooling system is provided for the PE components, the high-voltage battery, and the like to resolve self-heating. The PE components and the high-voltage battery are disposed in a loop where a coolant circulates, and the PE components and the high-voltage battery exchange heat with the coolant.

As shown in FIG. 1, a system for overcooling a drive motor according to various exemplary embodiments of the present invention may include three or more cooling loops configured to cool elements of an eco-friendly vehicle. The three or more loops include a first cooling loop 100, a second cooling loop 200, and a third cooling loop 300.

In the first cooling loop 10, a first coolant flows. The first coolant exchanges heat with a power electronics (PE) radiator 120, a power electronics (PE) part 140 and a drive motor cooler 160 which are disposed in the first cooling loop 10. The first coolant is cooled while passing through the PE radiator 120.

The first coolant having passed through the PE radiator 120 exchanges heat with the PE part 140 and cools the PE part 140. As described above, the PE part 140 includes an inverter, an LDC, an OBC or the like.

Thereafter, the first coolant exchanges heat with the drive motor cooler 160. The first coolant having passed through the PE part 140 flows toward the drive motor cooler 160. The drive motor cooler 160 cools a drive motor 180 and cools oil supplied to the drive motor 180 for cooling a stator, a rotor, etc., of the drive motor 180. In the drive motor cooler 160, the temperature of the cooling oil is lowered by the first coolant circulating the first cooling loop 100.

The cooling oil cooled by the drive motor cooler 160 is supplied to the drive motor 180, cooling the drive motor 180. A temperature sensor 190 configured to detect the temperature of the drive motor 180 in real time is provided in the drive motor 180.

The first coolant with increased temperature after passing through the drive motor cooler 160 exchanges heat with a condenser 340 of the third cooling loop 300, is again cooled by the PE radiator 120, and then circulates the first cooling loop 100.

In the second cooling loop 200, a second coolant flows to absorb heat generated from a battery and related parts (hereinafter referred to as a battery module). A battery radiator 220, a battery module 240, and a battery chiller 260 are disposed in the second cooling loop 200. The second coolant cooled by passing through the battery radiator 220 exchanges heat with the battery module 240 and cools the battery module 240 and the battery chiller 260.

The second coolant having passed through the battery chiller 260 exchanges heat with the condenser 340 of the third cooling loop 300, is again cooled by the battery radiator 220, and then circulates the second cooling loop 200.

The third cooling loop 300 may form an air conditioning system of the vehicle. The third cooling loop 300 may further include additional elements to cool or heat the vehicle cabin, but a detailed description thereof will be omitted. A refrigerant flows in the third cooling loop 300, and a compressor 320 and the condenser 340 are disposed in the third cooling loop 300.

The compressor 320 compresses the refrigerant supplied in the third cooling loop 300 into a high-temperature and high-pressure state and transmits the compressed refrigerant to the condenser 340, and the condenser 340 condenses the compressed refrigerant. According to various exemplary embodiments of the present invention, the compressor 320 may be an electric compressor, and the condenser 340 may be a water-cooled condenser.

The refrigerant of the third cooling loop 300 is configured to exchange heat with the second coolant passing through the battery chiller 260, and the temperature of the second coolant passing through the battery chiller 260 may be adjusted as needed.

The condenser 340 is in a heat exchange relationship with the first cooling loop 100 and the second cooling loop 200. The first coolant and the second coolant are configured to exchange heat with the condenser 340 before returning to the PE radiator 120 and the battery radiator 220, respectively.

Figure 2:
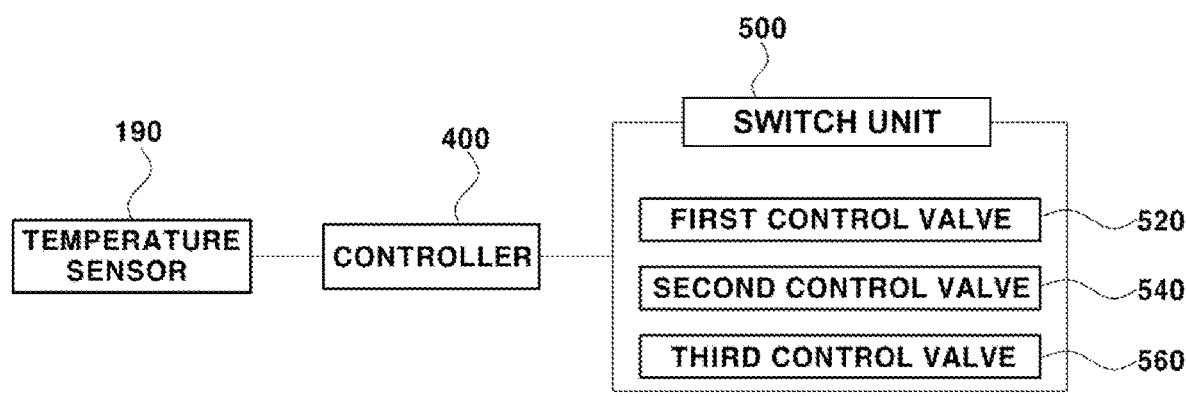
FIG. 2 is a block diagram of the system according to various exemplary embodiments of the present invention.
Figure 3:
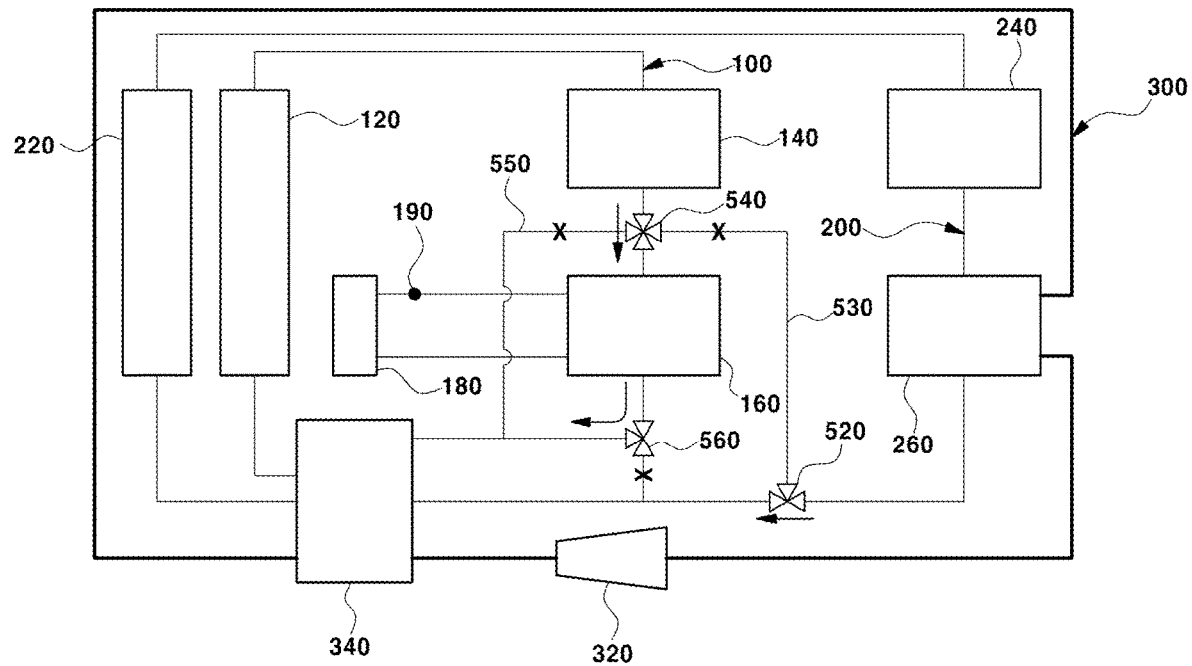
FIG. 3 is a view exemplarily illustrating the system according to various exemplary embodiments of the present invention, when a specific condition does not occur.
Figure 4:
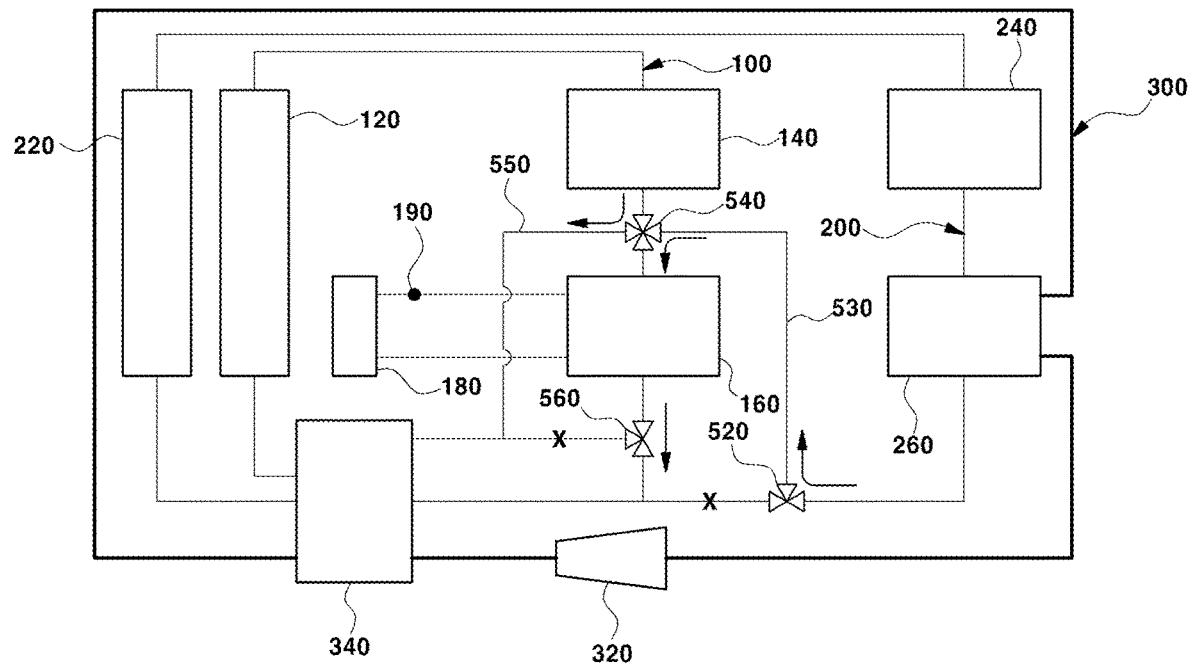
FIG. 4 is a view exemplarily illustrating the system according to various exemplary embodiments of the present invention, when the specific condition occurs.

Referring to FIG. 2, FIG. 3 and FIG. 4, the system according to various exemplary embodiments of the present invention further includes a controller 400 and a switch unit 500. The controller 400 is configured to control the switch unit 500. The controller 400 controls the switch unit 500 to provide additional cooling to the drive motor 180 when a specific condition occurs. In more detail, the controller 400 controls the switch unit 500 to supply the second coolant of the second cooling loop 200 to the drive motor cooler 160.

According to various exemplary embodiments of the present invention, the switch unit 500 may include control valves configured to change flow paths of the first coolant and the second coolant. However, the switch unit 500 is not limited in a direction control valve, and may employ any unit which may provide additional cooling to the drive motor cooler 160 through flow path change when the specific condition occurs.

According to various exemplary embodiments of the present invention, the switch unit 500 may include a first control valve 520, a second control valve 540, and a third control valve 560.

The first control valve 520 is configured to be controllable so that the second coolant having exchanged heat with the battery chiller 260 is directed to the drive motor cooler 160. The first control valve 520 is disposed between the battery chiller 260 of the second cooling loop 200 and the condenser 340 and directs the second coolant flowing in the second cooling loop 200 to the first cooling loop 100. According to various exemplary embodiments of the present invention, the first control valve 520 may be a three-way control valve.

The first control valve 520 is configured to selectively form two flow paths and may include a first position and a second position. The second coolant that has passed the battery chiller 260 flows directly to the condenser 340 in the first position of the first control valve 520 (with reference to FIG. 3). The second coolant having passed the battery chiller 260 is directed to the first cooling loop 100 in the second position of the first control valve 520 such that the second coolant passes through the drive motor cooler 160 (with reference to FIG. 4).

The second control valve 540 is configured to allow the first coolant to bypass the drive motor cooler 160. When the first control valve 520 is controlled such that the second coolant is in a heat exchange relationship with the drive motor cooler 160, the second control valve 540 is controlled such that the first coolant bypasses the drive motor cooler 160. The second control valve 540 is disposed between the PE part 140 and the drive motor cooler 160 and is connected to the first control valve 520 by a first pipe 530. According to various exemplary embodiments of the present invention, the second control valve may be four-way control valve.

The second control valve 540 includes a third position and a fourth position. When the second control valve 540 is in the third position, a flow path is formed such that the first coolant flows from the PE part 140 to the drive motor cooler 160 (with reference to FIG. 3). When the second control valve 540 is in the fourth position, the first coolant is configured to bypass the drive motor cooler 160 (with reference to FIG. 4). That is, when the second control valve 540 is in the fourth position, the first coolant passes through the PE part 140 and then is directed to the condenser 340 along a second pipe 550. The second pipe 550 connects the second control valve 540 to a flow path of the first cooling loop 100 between the drive motor cooler 160 and the condenser 340. The second pipe 550 is connected to an outlet side when the third control valve 560 is in a fifth position, which will be described below.

The third control valve 560 is disposed between the drive motor cooler 160 of the first cooling loop 100 and the condenser 340. According to various exemplary embodiments of the present invention, the third control valve 560 is a three-way control valve. The third control valve 560 includes the fifth position and a sixth position.

When the third control valve 560 is in the fifth position, the first coolant having passed through the drive motor cooler 160 is directed to the condenser 340 (with reference to FIG. 3). When the third control valve 560 is in the sixth position, the second coolant having passed through the drive motor cooler 160 is configured to return to the second cooling loop 20 (with reference to FIG. 4).

That is, as shown in FIG. 3, when the first control valve 520 is in the first position, the second control valve 540 is in the second position and the third control valve 560 is in the fifth position, the first cooling loop 100, the second cooling loop 200, and the third cooling loop 300 are formed. The first coolant having passed through the PE part 140 in the first cooling loop 100 passes through the drive motor cooler 160 and then flows toward the condenser 340. Furthermore, the second coolant having passed through the battery chiller 260 in the second cooling loop 200 flows toward the condenser 340.

As shown in FIG. 4, when the specific condition occurs, the control unit 400 controls the first control valve 520 to move from the first position to the second position, the second control valve 540 from the third position to the fourth position, and the third control valve 560 from the fifth position to the sixth position.

According to various exemplary embodiments of the present invention, the specific condition means a time when increase in power performance of the drive motor 180 is necessary. According to various exemplary embodiments of the present invention, the time when increase in power performance of the drive motor 180 is necessary may be determined by comparing the temperature of the drive motor 180 measured by the temperature sensor 190 with a predetermined reference temperature TR. That is, when the temperature of the drive motor 180 detected in real time is equal to or greater than the predetermined reference temperature $T_R$, the controller 400 determines that the specific condition occurs and changes the positions of the first control valve 520, the second control valve 540, and the third control valve 560.

Therefore, according to various exemplary embodiments of the present invention, the first and second cooling loops 100 and 200 are configured as described above so that the first coolant with a temperature increased after cooling the PE part 140 bypasses the drive motor cooler 160 and the second coolant having a relatively low temperature is supplied to the drive motor cooler 160, increasing the output of the drive motor 180 without changing the specifications of the drive motor 180.

Figure 5:
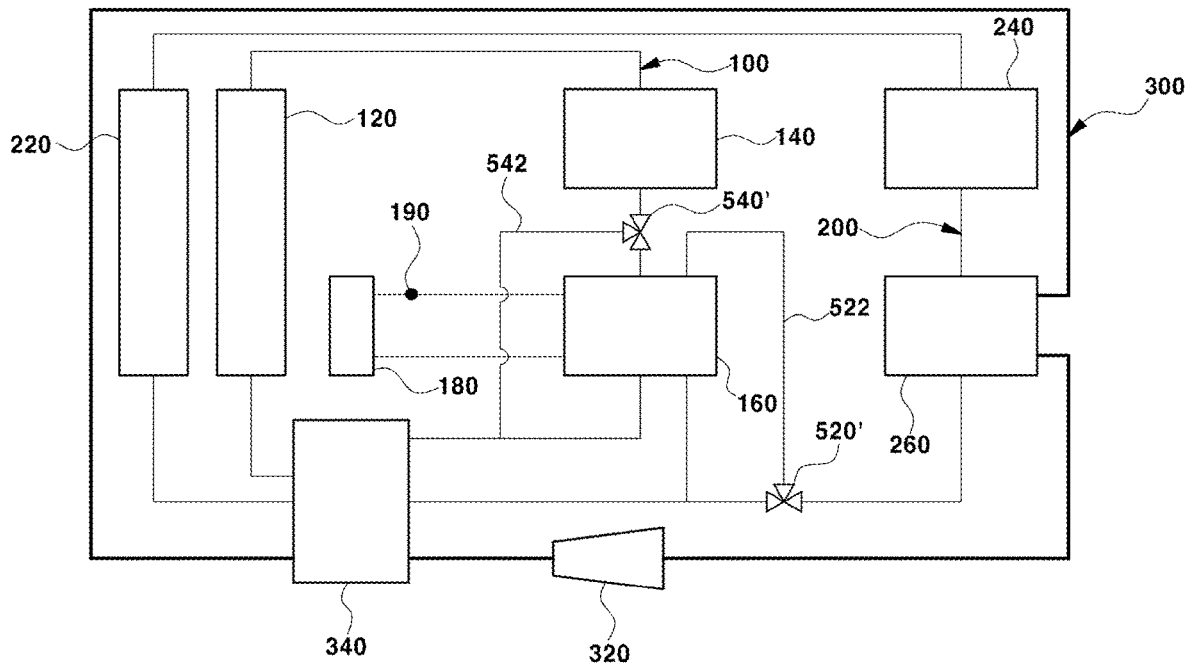
FIG. 5 is a view exemplarily illustrating a system for overcooling a drive motor according to various exemplary embodiments of the present invention.

As shown in FIG. 5, according to various exemplary embodiments of the present invention, the switch unit 500 may include a first control valve 520' and a second control valve 540'.

The first control valve 520' may be disposed between the battery chiller 260 of the second cooling loop 200 and the condenser 340. The first control valve 520' is configured to be controllable so that the second coolant having exchanged heat with the battery chiller 260 is directed to the drive motor cooler 160. A flow path 522 passing through the drive motor cooler 160 is connected to the first control valve 520', so the second coolant flowing in the second cooling loop 200 can be directed to the drive motor cooler 160. After passing through the drive motor cooler 160, the flow path 522 is reconnected to the second cooling loop 200. According to various exemplary embodiments of the present invention, the first control valve 520' may be a three-way control valve. The flow path of the second coolant may be changed by switching the opening and closing positions of the three-way control valve.

The second control valve 540' is configured to be controllable so that the first coolant bypasses the drive motor cooler 160. The second control valve 540' is disposed between the PE part 140 and the drive motor cooler 160, and an additional flow path 542 is connected to the second control valve 540' to such that the first coolant bypasses the drive motor cooler 160. The flow path 542 is connected to the first cooling loop 100 so that the first coolant having passed through the PE part 140 bypassed the drive motor cooler 160 returns to the first cooling loop 100. According to various exemplary embodiments of the present invention, the second control valve 540' is a three-way valve.

As described above, when the specific condition occurs, the second coolant is configured to flow to the flow path 522 by controlling the opening and closing positions of the first control valve 520', and the second coolant provides additional cooling to the drive motor cooler 160. Furthermore, when the specific condition occurs, the first coolant is configured to flow to the flow path 542 by controlling the opening and closing positions of the second control valve 540', and thus, the first coolant may bypass the drive motor cooler 160.

Figure 6:
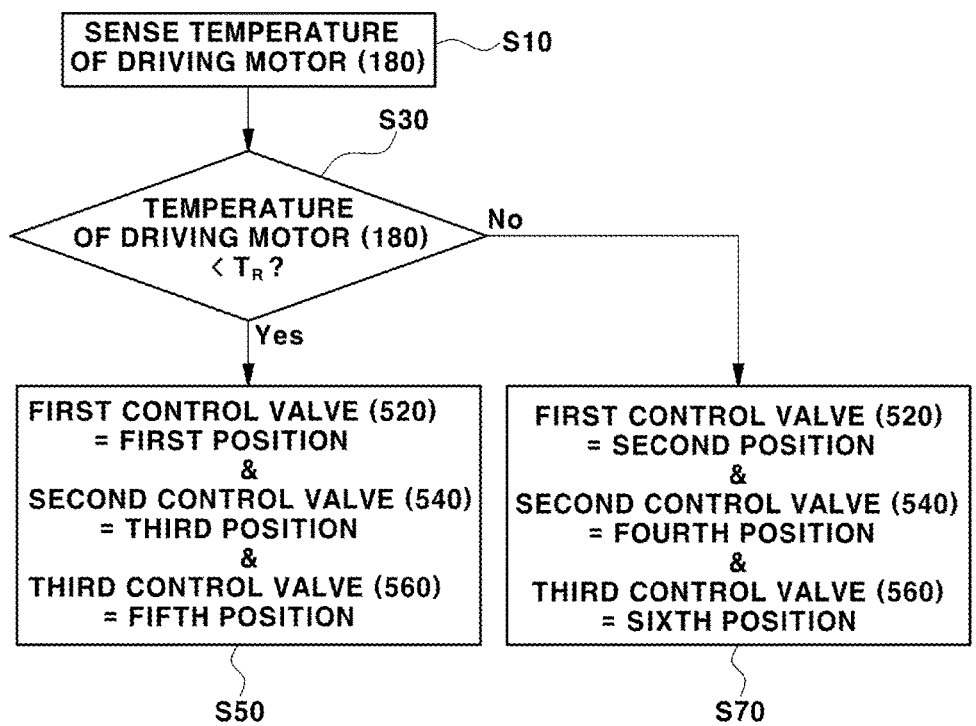
FIG. 6 is a flowchart illustrating a method for controlling a system for overcooling a drive motor according to various exemplary embodiments of the present invention.

Hereinafter, referring to FIG. 6, a method for controlling the system according to various exemplary embodiments of the present invention will be described. The above-described information also applies thereto, and a detailed description thereof will thus be omitted.

First, the temperature of the drive motor 180 is detected in real time by the temperature sensor 190 (S10). The measured temperature is transmitted to the controller 400.

The controller 400 determines whether or not a specific condition occurs (S30). The controller 400 forms the first cooling loop 100, the second cooling loop 200 and the third cooling loop 300 as usual when the temperature of the drive motor 180 is lower than the predetermined reference temperature $T_R$ (S50). The controller 400 controls the first control valve 520 to be in the first position, the second control valve 540 to be in the third position, and the third control valve 560 to be in the fifth position. To be illustrated, the first control valve 520 is controlled such that the second coolant having passed through the battery chiller 260 flows toward the condenser 340, the second control valve 540 is controlled such that the first coolant having passed through the PE part 140 flows toward the drive motor cooler 160, and the third control valve 560 is controlled such that the first coolant having passed through the drive motor cooler 160 flows toward the condenser 340.

The control unit 400 determines that the specific condition has occurred when the temperature of the drive motor 180 is equal to or greater than the predetermined reference temperature $T_R$ and changes the positions of the first control valve 520, the second control valve 540 and the third control valve 560 (S70). The controller 400 controls the first control valve 520 to be in the second position, the second control valve 540 to be in the fourth position, and the third control valve 560 to be in the sixth position. The controller 400 controls the first control valve 520 such that the second coolant having passed through the battery chiller 260 flows toward the second control valve 540, and controls the first to third control valves 520, 540 and 560 such that the second coolant passes through the drive motor cooler 160 through the second control valve 540 and then returns to the second cooling loop 200 through the third control valve 560. Furthermore, the controller 400 controls the second control valve 540 such that the first coolant having passed through the PE part 140 bypasses the drive motor cooler 160. In this case, the first coolant flows toward the condenser 340 without passing through the drive motor cooler 160. Therefore, according to various exemplary embodiments of the present invention, the first cooling loop 100 and the second cooling loop 200 are configured to operate independently and to provide additional cooling to the drive motor cooler 160 of the first cooling loop 100 using the second coolant of the second cooling loop 200 as needed.

Because the first control valve 520' and the second control valve 540' are also controlled in a similar manner as the above-described manner, the control method thereof will be appreciated by those skilled in the art and a detailed description thereof will thus be omitted.

The system according to various exemplary embodiments of the present invention may resolve the power performance requirement of the drive motor under certain circumstances. It is not necessary to apply a motor having high specifications to increase power performance, and thus, both output increase and cost reduction may be achieved.

As is apparent from the above description, various aspects of the present invention are directed to providing a system for overcooling a drive motor which may improve power performance of the drive motor through output increase without changing the specifications of the drive motor or changing a drive motor cooling system.

That is to say, the system according to various exemplary embodiments of the present invention are directed to providing additional cooling to the drive motor only for a designated time, for which the maximum output of the drive motor is used, improving power performance of the drive motor without changing the specifications of the drive motor of changing the drive motor cooling system.

Furthermore, various aspects of the present invention are directed to providing a system for overcooling a drive motor which can reduce costs.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for overcooling a drive motor, the system comprising:
   a first cooling loop in which a first coolant is configured to circulate, the first coolant being in a heat exchange relationship with a power electronics (PE) part and a drive motor cooler and configured to cool cooling oil supplied to the drive motor;
   a second cooling loop disposed independently from the first cooling loop, wherein a second coolant circulates in the second cooling loop, the second coolant being in a heat exchange relationship with a battery module and a battery chiller; and
   a switch unit configured to selectively shift a flow path of the second coolant such that the second coolant is selectively in a heat exchange with the drive motor cooler.

2. The system of claim 1, wherein the flow path of the second coolant is configured to shift when a temperature of the drive motor is equal to or greater than a predetermined reference temperature.

3. The system of claim 2, further including a temperature sensor configured to measure the temperature of the drive motor in real time.

4. The system of claim 2,
   wherein the switch unit includes a first control valve disposed adjacent to an outlet of the battery chiller and configured to switch the flow path of the second coolant to the first cooling loop, and
   wherein the first control valve is swtichable between a first position and a second position, the first control valve in the first position circulates the second coolant along the second cooling loop, and the first control valve in the second position circulates the second coolant to flow towards an inlet of the drive motor cooler in the first cooling loop.

5. The system of claim 4,
   wherein the switch unit further includes a second control valve disposed adjacent to the inlet of the drive motor cooler in the first cooling loop and configured so that the second coolant flows in the drive motor cooler when the first control valve is switched to the second position,
   wherein the second control valve is switchable between a third position and a fourth position, and
   wherein when the second control valve is switched to the third position the first coolant is placed in a heat exchange with the drive motor cooler and when the second control valve is switched to the fourth position the second coolant is in a heat exchange with the drive motor cooler.

6. The system of claim 5, wherein the switch unit further includes a third control valve configured to be switchable between a fifth position and a sixth position, wherein the first coolant flowing out of the drive motor cooler is circulated into the first cooling loop in the fifth position of the third control valve, and the second coolant flowing out of the drive motor cooler is returned to the second cooling loop in the sixth position of the third control valve.

7. The system of claim 6, wherein, when the temperature of the drive motor is equal to or greater than the predetermined reference temperature:
the first control valve is disposed in the second position;
the second control valve is disposed in the fourth position; and
the third control valve is disposed in the sixth position.

8. The system of claim 1, wherein the first cooling loop further includes a power electronics (PE) radiator configured to cool the first coolant.

9. The system of claim 1, wherein the second cooling loop further includes a battery radiator configured to cool the second coolant.

10. The system of claim 1, wherein the second coolant flowing out of the battery chiller has a lower temperature than the first coolant flowing out of the PE part.

11. The system of claim 3, further including a controller configured to receive a signal for the measured temperature of the drive motor detected by the temperature sensor in real time and to control the switch unit based on the measured temperature.

12. The system of claim 1, further including a third cooling loop including a compressor and a condenser being in a heat exchange relationship with the first cooling loop and the second cooling loop, wherein a refrigerant circulates in the third cooling loop.

13. The system of claim 12, wherein the third cooling loop is placed in a heat exchange relationship with the battery chiller.

14. A system for overcooling a drive motor, the system comprising:
a first cooling loop, wherein a first coolant is configured to circulate in the first cooling loop, the first coolant being in a heat exchange relationship with a power electronics (PE) part and a drive motor cooler configured to cool cooling oil supplied to the drive motor;
a second cooling loop arranged independently from the first cooling loop, wherein a second coolant is configured to circulate in the second cooling loop, the second coolant being in a heat exchange relationship with a battery module and a battery chiller;
a first control valve being controllable such that the second coolant flowing out of the battery chiller is directed to the drive motor cooler; and
a second control valve being controllable such that the first coolant bypasses the drive motor cooler.

15. The system according to claim 14, wherein, when a temperature of the drive motor is equal to or greater than a predetermined reference temperature, the second coolant is directed to the drive motor cooler.

16. The system according to claim 14, wherein the second control valve is configured to bypass the first coolant from the drive motor cooler when the second coolant is directed to the drive motor cooler.

17. The system according to claim 14, wherein the second coolant flowing out of the drive motor cooler returns to the second cooling loop, and the first coolant bypassing the drive motor cooler returns to the first cooling loop.

18. A method for controlling the system according to claim 1, the method including:
detecting the temperature of the drive motor in real time;
comparing the temperature of the drive motor with a predetermined reference temperature; and
directing the second coolant passing the battery chiller to the drive motor cooler and bypassing the first coolant flowing out of the PE part from the battery chiller when the temperature of the drive motor is equal to or greater than the predetermined reference temperature.

19. The method according to claim 18, further including circulating the bypassed first coolant in the first cooling loop and returning the second coolant passing through the drive motor cooler to the second cooling loop.

20. A non-transitory computer readable storage medium on which a program for performing the method of claim 18 is recorded.

* * * * *